United States Patent [19]

Mondshine

[11] Patent Number: 4,620,596
[45] Date of Patent: Nov. 4, 1986

[54] WELL DRILLING, WORKOVER AND COMPLETION FLUIDS

[75] Inventor: Thomas C. Mondshine, Houston, Tex.

[73] Assignee: Texas United Chemical Corp., Houston, Tex.

[21] Appl. No.: 674,378

[22] PCT Filed: Sep. 15, 1983

[86] PCT No.: PCT/US83/01408
§ 371 Date: Oct. 31, 1984
§ 102(e) Date: Oct. 31, 1984

[87] PCT Pub. No.: WO85/01309
PCT Pub. Date: Mar. 28, 1985

[51] Int. Cl.$^4$ ............................................. E21B 33/138
[52] U.S. Cl. ..................................... 166/292; 166/281; 175/72; 252/8.551
[58] Field of Search ............. 252/8.5 A, 8.5 B, 8.55 R, 252/8.5 LC; 166/281, 292, 305 R, 312; 175/72

[56] References Cited

U.S. PATENT DOCUMENTS

| | | | |
|---|---|---|---|
| 3,675,717 | 7/1972 | Goins et al. | 252/8.55 X |
| 4,046,197 | 9/1977 | Gruesbeck et al. | 252/8.5 X |
| 4,175,042 | 11/1979 | Mondshine | 252/8.55 |
| 4,186,803 | 2/1980 | Mondshine | 166/292 |
| 4,369,843 | 1/1983 | Mondshine | 252/8.55 X |

OTHER PUBLICATIONS

Ellis et al, *World Oil*, Nov., 1981, pp. 75–81.
Mondshine, "Completion Fluid uses Salt for Bridging, Weighting", *Oil and Gas Journal*, Aug. 22, 1977.
Patton et al, "Well Completions and Workovers: Part 7–Considerations for Selecting Well Servicing Fluids", *Petroleum Engineer International*, 1980, pp. 50, 52, 56.
Gray et al., Composition and Properties of Oil Well Drilling Fluids, 4th edition, 1980, pp. 497–512, 522–525.

*Primary Examiner*—Herbert B. Guynn
*Attorney, Agent, or Firm*—Roy F. House

[57] ABSTRACT

Nondamaging treating fluids containing sparingly soluble hydrated borate bridging agents having a particle size distribution within the range about 1 micron to about 2000 microns are disclosed. The treating fluids comprise an aqueous salt solution having a density from about 1.0 g/cm$^3$ to about 1.20 g/cm$^3$, the hydrated borate bridging agent in an amount sufficient to bridge and seal off a subterranean formation contacted by the treating fluid, and a viscosifier and suspension additive in an amount to provide sufficient viscosity to maintain the bridging agent in suspension. A fluid loss control additive may be added to enhance the fluid loss control and formation sealing capacity of the treating fluid.

Well treatments may be practiced by pumping or discharging the fluid or a slug or pill of the fluid into an oil, gas water, injection or storage well where operations are to be conducted in which it is desired to temporarily plug the permeable zone while such operations are carried out. Thereafter, the hydrated borate bridging agents are removed by connate water from the permeable zone, or by a nonsaturated brine wash, or ordinary water or acid circulated in the well.

20 Claims, No Drawings

WELL DRILLING, WORKOVER AND COMPLETION FLUIDS

FIELD OF THE INVENTION

The invention relates to a method of completing a well after it has been drilled, or of servicing a well by workover operations. More particularly, it relates to a method of completing and workover of a well by contacting a subterranean formation which produces hydrocarbons with aqueous well completion and workover fluids to maintain the hydrocarbons in the producing well formation or formations under control while at the same time inhibiting or preventing damage to the producing formation or formations during the completion or workover operations.

BACKGROUND OF THE INVENTION

After a well has been drilled into the earth's surface, one or more subterranean producing formations may be encountered. It is then desirable to complete the well so as to obtain the maximum hydrocarbon production from such subterranean producing formations, and to complete such well in a manner so that the pressure in the subterranean producing formations is controlled during completion operations, while bridging or sealing off the producing formation to inhibit damage thereto and to minimize fluid loss into the formation which might inhibit or in some cases substantially reduce the production of hydrocarbons from the subterranean producing formation.

Also, it is desirable or necessary after a period of time to perform workover or other service operations on a previously drilled well, and during such workover or service operations, it is desirable to control the pressure in the subterranean producing formation or formations while at the same time bridging or sealing off the formations in a manner so as to minimize particle invasion and fluid loss into the producing formation or formations and thereby reduce if not substantially eliminate damage to the formations.

In addition to the necessary required density characteristics of a workover and completion fluid, it is desirable to seal off or temporarily plug the face of the subterranean producing formation or formations in the well bore so that during the completion and workover operation fluid and solids in the fluid are not lost to the producing formation which might cause damage thereto.

Heretofore various types of workover and completion fluids with components therein of a particle size to bridge and seal off the producing formations have been employed. Workover and completion fluids should have fluid loss (filter loss) control to prevent substantial fluid invasion of the formation. This is achieved by a combination of a fluid loss control agent and a bridging agent.

Various types of soluble or degradable bridging materials are available commercially, and the choice between them depends on reservoir conditions and type of operation. Sized particles of oil-soluble resins or waxes have been used as bridging agents for oil reservoirs. Such particles must be removed by dissolving them in oil when used in dry gas reservoirs or water injection wells. Calcium carbonates were the first degradable bridging particles to be used in workover and completion fluids. On completion of the job, they are removed with acid if necessary. Acidization is an extra operation and additional expense, except in carbonate reservoirs that must be acidized. Furthermore, the acid may dissolve iron on the way down to the acidizing zone and introduce iron compounds into the formation. Then, when the acid is spent, the pH rises, iron hydroxide is precipitated, and formation damage results. All of the carbonate particles may not be contacted by the acid. To avoid this problem, alternate slugs of acid and diverting agent are necessary.

I have found that workover and completion fluids can be formulated utilizing sized particles of a water soluble salt as a bridging agent suspended in a saturated brine solution in which the salt is substantially insoluble. See U.S. Pat. Nos. 4,175,042; 4,186,803; and 4,369,843.

The treating fluid comprises a saturated aqueous saline solution with at least one water soluble salt which is substantially insoluble in the saturated saline solution, the water soluble salt having a particle size range of about 5 microns to about 800 microns with greater than 5 percent of the particles being coarser than 44 microns to control the pressure in the formation while bridging and sealing it, and also minimizing particle invasion to the formation. A minor amount of fluid loss additive to inhibit loss of fluid into the subterranean producing formation, and a suspension additive to prevent settling of the water soluble salt particles is included in the treating fluid. The water soluble salt which is substantially insoluble in the saline solution is added in sufficient quantity to control the pressure in the producing formation by increasing the density of the treating fluid.

The bridging and sealing salt particles used in the well completion and workover method can be dissolved by the flow of produced field brine or by the injection of water or an unsaturated saline solution. This eliminates the undesirable use of oil or acid solutions to remove the bridge from the subterranean hydrocarbon producing formation. The saturated saline solution is formed by dissolving a salt or mixture of salts in water and normally the minimum density of the saturated saline solution is approximately at least 1.20 grams per cubic centimeter.

SUMMARY OF THE INVENTION

The present invention broadly comprises an improved well completion and workover fluid and method wherein a subterranean formation or formations is contacted with a fluid having a density less than about 1.26 g/cm$^3$ for controlling formation pressure and also for temporarily bridging and sealing off the formation or formations in the well bore to minimize fluid loss or damage to the formations. The treating fluid comprises an aqueous liquid having a density in the range from about 1.0 to about 1.20 g/cm$^3$ (8.33–10.0 ppg) in which there is suspended a bridging agent comprising a hydrated borate of sodium and/or calcium to control the pressure in the formation while bridging and sealing it, thus minimizing particle invasion to the formation. A minor amount of fluid loss additive to inhibit loss of fluid into the formation, and a suspension additive to prevent settling of the borate particles is included in the treating fluid. The hydrated borate is added in sufficient quantity to control the pressure in the formation, in the density range from about 1.007 to about 1.26 g/cm$^3$, by increasing the density of the treating fluid, and in sufficient quantity to effectively seal the formation.

The hydrated borate particles used in these novel well completing and workover fluids and methods have a limited solubility in water which is insufficient to appreciably dissolve the particles in the aqueous liquid but which is sufficient, however, to allow the particles to be dissolved by the flow of produced field brine or by the injection of water or other unsaturated aqueous solution. This eliminates the undesirable use of oil or acid solutions to remove the bridge from the formation. However, aqueous acid can be used if desired.

Thus the invention provides for the temporary control of fluid loss to productive formations during completion or workover operations where densities ranging from about 1.007 to about 1.26 g/cm$^3$ are needed to control the formation pressure. The invention further provides for a readily removable bridging or filter cake, i.e., one that is solubilized by contacting with an aqueous liquid, during workover or completion operations. Formation damage caused by excessive fluid invasion of the formation is minimized utilizing the present invention.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DESCRIPTION OF THE PREFERRED EMBODIMENT

The present invention is based on my discovery that certain naturally occurring hydrated borates of sodium and/or calcium are uniquely applicable for providing water-soluble or acid soluble completion and workover fluids in the density range from about 1.007 to about 1.26 g/cm$^3$. Ulexite and Probertite are naturally occurring hydrated borates of sodium and calcium. Ulexite is principally described by the molecular formula NaCaB$_5$O$_9$.8H$_2$O. Probertite is principally described by the molecular formula NaCaB$_5$O$_9$.5H$_2$O. Colemanite is a calcium borate principally described by the molecular formula Ca$_2$B$_6$O$_{11}$.5H$_2$O.

These materials have the solubility characteristics indicated in Table A and Table B. The Ulexite, having a somewhat higher solubility than Colemanite or Probertite, is the preferred hydrated borate bridging and weighting agent. The hydrated borates, when properly sized and graded, can be suspended in an aqueous liquid such as fresh water, KCl or other salt solutions or brines of various densities up to about 1.20 g/cm$^3$ to provide water-soluble completion and workover fluids in the density range from about 1.007 to 1.26 g/cm$^3$.

The hydrated borate should have a particle size distribution ranging from about 1 micron to about 800 microns with at least 1% of the particles being greater than 44 microns to adequately bridge and seal typical formations during workover and completion operations. Preferably for most workover and completion operations, the particle size distribution will be such that: at least 5% of the particles will be greater than 44 microns; at least 50% of the particles will be reater than 20 microns; and less than 10% of the particles will have a particle size less than 10 microns.

In gravel pack operations, such as described in U.S. Pat. No. 3,675,717, less than about 5% by weight of the particles can be greater than about 44 microns for a successful gravel pack. That is, at least 95% by weight of the particles must not exceed about 44 microns in size. It is essential in gravel packing operations that the concentration and particle size of the carrier fluid not have any effect on the spacing of the gravel particles and be such that it will flow through the voids between the gravel to enable the gravel to be properly placed. If more than about 5% by weight of the hydrated borate particles in the gravel packing carrier liquid exceeds about 44 microns in size, the gravel bed will become plugged which renders proper placement of the gravel difficult, if not impossible.

A coarser particle size hydrated borate can be used both as a weighting material and as a bridging agent for controlling lost circulation in higher permeability type formations. In extremely high permeability formations, fractured formations, or vugular type formations, the particle size should be expanded to include particles as high as 2000 microns for effective bridging.

The amount of hydrated borate added to the aqueous suspension medium, which may contain dissolved inorganic salts, having a density in the range from about 1.0 to about 1.20 g/cm$^3$, need only be sufficient to effectively bridge and seal off the desired formations. Generally, the amount will vary from about 14 kg/m$^3$ to about 570 kg/m$^3$ of the aqueous suspension medium depending on the density desired in the treating fluid and the density of the aqueous suspension medium, preferably from about 20 kg/m$^3$ to about 385 kg/m$^3$. Thus the treating fluid resulting from the combination of the aqueous suspension medium and the hydrated borate must have a density sufficient to balance or exceed the formation pressure in the well bore, and it is well known to those skilled in the art how to calculate the amount of hydrated borate and aqueous suspension medium required to obtain such density, and must contain hydrated borate particles to effectively bridge and seal the desired subterranean formations.

The aqueous suspension medium with the hydrated borate therein as above described may be employed with any suitable viscosifier to provide the desired viscosity and suspension characteristics to the treating fluid to retain the hydrated borate particles in suspension in the aqueous liquid.

One suitable additive for obtaining desired viscosity and suspension is hydroxyethyl cellulose. Hydroxyethyl cellulose is prepared by treating cellulose with caustic and then reacting the caustic treated cellulose with about 1 to 3 moles of ethylene oxide for each anhydroglucose unit in the cellulose molecule. The viscosity of an aqueous solution of hydroxyethyl cellulose depends upon the concentration and molecular weight of the hydroxyethyl cellulose. Broadly, the hydroxyethyl cellulose employed in the practice of this invention has about 1 to 3 moles of substituent ethylene oxide per anhydroglucose unit and is characterized by a Brookfield viscosity of about 1,500 to 5,000 centipoises at 25° C. for a 1 weight percent solution thereof. A preferred hydroxyethyl cellulose has about 2.5 moles of substituent ethylene oxide per anhydroglucose unit and is characterized by a viscosity of about 1,500 to 2,500 centipoises at 25° C. for a 1 weight percent solution. A suitable hydroxyethyl cellulose is marketed by Union Carbide under the trademark Cellosize HEC-20. Hydroxyethyl cellulose is employed to increase the viscosity of the fluid and to increase the stability of the dispersion.

In general, most of the water soluble cellulose ethers can be used as a viscosifier and to provide suspension for the borate particles of the invention. The cellulose ethers which can be used include, among others: the various carboxyalkyl cellulose ethers, e.g., carboxyethyl cellulose and carboxymethyl cellulose (CMC); mixed ethers such as carboxyalkyl hydroxyalkyl ethers, e.g., carboxymethyl hydroxyethyl cellulose (CMHEC); hydroxyalkyl celluloses such as hydroxyethyl cellulose, and hydroxypropyl cellulose; alkylhydroxyalkyl celluloses such as methylhydroxypropyl cellulose; alkyl celluloses such as methyl cellulose, ethyl cellulose, and propyl cellulose; alkylcarboxylalkyl celluloses such as ethylcarboxymethyl cellulose; alkylalkyl celluloses such as methylethyl cellulose; and hydroxyalkylalkyl celluloses such as hydroxyethylmethyl cellulose, hydroxypropylmethyl cellulose; and the like. Many of the cellulose ethers are available commercially in various grades. The carboxy-substituted cellulose ethers are available as the alkali metal salt, usually the sodium salt. However, the metal is seldom referred to and they are commonly referred to as CMC, CMHEC, etc. For example, water soluble CMC is available in various degrees of carboxylate substitution ranging from about 0.3 up to the maximum degree of substitution of 3.0. In general, CMC having a degree of substitution in the range of 0.65 to 0.95 is preferred. CMC having a degree of substitution in the range of 0.85 to 0.95 is a more preferred cellulose ether. CMC having a degree of substitution less than the above preferred ranges usually provides too low a viscosity and is thus less desirable. The degree of substitution of CMC is commonly designated in practice as CMC-7, CMC-9, CMC-12, etc., where the 7, 9 and 12 refer to a degree of substitution of 0.7, 0.9, and 1.2 respectively. For example, in CMHEC it is preferred that the carboxymethyl degree of substitution be at least 0.4. The degree of hydroxyethyl substitution is less important and can range widely, e.g., from about 0.1 or lower to about 4 or higher.

Xanthan gum, which is used as a suspending agent, is also available commercially. It is a hydrophilic colloid produced by bacterium of the species *Xanthomonas campestris*. The colloid is a polymer containing mannose, glucose, glucuronic acid salts such as potassium glucuronate, sodium glucuronate, or the like, and acetyl radicals. Other Xanthomonas bacteria have been found which produce the hydrophilic gum and any of the xanthan gums and their derivatives can be used in this invention.

Xanthan gum is a high molecular weight linear polysaccharide that is readily soluble in water to form a viscous fluid. Exemplary of the xanthan gums that can be employed is an industrial grade of xanthan gum marketed by the Kelco Company under the trademark Kelzan XC xanthan gum. Xanthan gum increases the gel strength of the fluid without appreciably increasing its viscosity.

Other suitable viscosifiers and suspension agents can be employed other than those specifically mentioned above, and I have found that any one of such viscosifiers and suspension agents, or any combination of mixture of suitable viscosifier and suspension agents may be employed, including those mentioned above in any amount as may be desired and preferably in the range of about 0.5 kg/m$^3$ to about 14 kg/m$^3$ of treating fluid.

In general, polymers which complex and cross-link in the presence of the borate anion at alkaline pH should not be used in the treating fluids of this invention. Polymers which contain two hydroxyl (OH) groups positioned in the cis-form on adjacent carbon atom, or on carbon atoms in a 1,3-relationship, react with borates to form five and six member rings, respectively, which further complex at alkaline pH to form didiol cross-linked complexes. Exemplary water soluble polymers are guar gum, gum arabic, locust bean gum, and polyvinyl alcohol.

Fluid loss control additives which are well known in the art may be employed including by way of example only, calcium lignosulfonate, chrome or ferro chrome lignosulfonate, starches such as corn, potato and tapioca and their derivatives and carboxymethyl cellulose having a degree of substitution in the range of 0.4 through 0.9. The fluid loss control constituents may be added in any amount desired and preferably in the range of about 0.5 kg/m$^3$ to about 28 kg/m$^3$ of treating fluid alone or in any combination.

Where any of the lignosulfonates are used either alone or with any of the other fluid loss control agents the amount may be in the range of about 0.5 kg/m$^3$ to about 55 kg/m$^3$ of treating fluid. Also, it is well known in the art that when any of the lignosulfonates are employed it is desirable to neutralize the acidic nature of the lignosulfonates. This may be done by adding a material to raise the pH of the completion fluid to at least 7. Any one or more of the alkaline earths, such as magnesium oxide or calcium oxide may be employed. Sodium hydroxide may also be used. The amount of material used to adjust the pH of the completion fluid is in the range of about 0.4 to about 14 kg/m$^3$ of treating fluid.

The invention can be used in the various applications involved in completions and workover operations where densities from about 1.007 g/cm$^3$ to about 1.26 g/cm$^3$ are required. Such applications include:

A. Completion and Workover Systems with Fluid Loss Control
B. Kill Fluids to Control Pressure
C. Lost Circulation Pills to Prevent Loss of Brines
   a. Unconsolidated sands
   b. Microfractures
   c. Massive Fractures and Vugular Formations
D. Disposal and Injection Wells
E. Drilling into Productive Formations
   a. Minimize Formation Damage
   b. Protect Water and Oil Sensitive Formations
   c. Eliminate Solids Invasion
   d. Control Water Invasion
F. Perforating
   a. Post Perforating Lost Circulation Pills
   b. Perforating Fluids to Prevent Invasion in Overbalanced Perforating
G. Gravel Packing
   a. Underreaming
   b. Sand Washing of Cased Hole Perforations
   c. Plasticizer for Two-Stage Gravel Placement
   d. Stabilizing Underreamed or Sand Washed Hole for Production Screen Placement
   e. Gravel Carrier Fluid
   f. Pill Placement to Control Loss of Clear Solutions During Gravel Placement
H. Fracturing
   a. Controlling Fluid Loss
   b. Diverting for Acid Treatment The following examples describe the manner and process of making and using the invention and set forth the best mode contemplated by the inventor of carrying out the invention but are not to be construed as limiting.

Table 1 lists typical treating fluid compositions and their properties.

EXAMPLE 5

A completion/workover fluid was prepared with finely ground Ulexite (100%) by weight having a particle size less than 74 microns), specific gravity=2.0, by mixing the following listed materials together in the order listed:

| | |
|---|---|
| 1.09 g/cm$^3$ NaCl brine | 1.0 m$^3$ |
| Hydroxyethyl cellulose (NATROSOL 250 HHR) | 2.857 kg |
| Calcium lignosulfonate | 14.286 kg |
| Pregelatonized Corn Starch | 7.143 kg |
| Carboxymethyl cellulose (CMC-7LT) | 1.429 kg |
| Ulexite | 28.57 kg |

This treating fluid exhibited good viscosity and suspension characteristics and excellent fluid loss control. The fluid effectively sealed a sand bed (prepared from sand having a particle size in the range from 125 microns to 177 microns) under $7.037 \times 10^4$ kg/m$^2$ (100 psi) differential pressure.

The filter cake deposited by this Ulexite-containing treating fluid on the sand bed was readily removed by flushing with water or brine at 150° F. Approximately 98% of the original permeability of the sand bed was obtained after flushing with water. For comparison, a sand bed treated with a treating fluid containing an equivalent amount of calcium carbonate showed only about 10% of the original sand bed permeability as the filter cake could not be removed by flushing with water.

EXAMPLE 6

A completion fluid was prepared as in Example 5 by mixing the materials listed in Table 2 together in the order listed. This fluid was filtered through an Aloxite disc having a diameter of 3.445 cm and a thickness of 0.635 cm, and having the permeability indicated in Table 2, for 30 minutes at a differential pressure of $(7.037 \times 10^4)$ kg/m$^2$. The amount of filtrate and filter cake thickness obtained are given in Table 2. Thereafter the disc was flushed with a sodium chloride brine having a density of 1.09 g/cm$^3$ at a temperature of 65.5°±2.8° C. for the time indicated in Table 2. The results obtained are given in Table 2.

COMPARATIVE EXAMPLE A

A completion fluid was prepared as in Example 6 except that calcium carbonate was used as a replacement for the Ulexite. The fluid was evaluated as in Example 6. The results obtained are given in Table 2.

The data in Table 2 indicate that the completion fluid containing Ulexite laid down a filter cake which was removed by flushing with water, whereas the completion fluid containing calcium carbonate laid down a filter cake which severely plugged the filter media.

EXAMPLE 7

The compatibility of saturated Ulexite solutions (in fresh water, 3% by weight potassium chloride, and 1.09 g/cm$^3$ sodium chloride brine) with various aqueous solutions containing either sodium sulfate, sodium bicarbonate, calcium chloride, or sodium chloride was determined by mixing the solutions together at various ratios and observing for evidence of precipitation.

None of the solutions produced precipitation. Thus completion and workover fluids containing Ulexite as a bridging agent will not produce damaging precipitates within a formation containing connate water.

TABLE A

| Hydrated Borate | Solubility in Fresh Water | | | Solubility in 1.09 g/cm$^3$ Brine | | |
|---|---|---|---|---|---|---|
| | Temp, °C. | pH | kg/m$^3$ | Temp, °C. | pH | kg/m$^3$ |
| Ulexite | 22.2 | 9.4 | 4.7 | 22.2 | 8.2 | 3.2 |
| | 65.5 | 9.5 | 7.6 | 65.5 | 8.3 | 5.8 |
| Probertite | 22.2 | NM* | 3.9 | | | |
| | 65.5 | NM | 4.3 | | | |
| Colemanite | 22.2 | 9.5 | 3.7 | 22.2 | 8.1 | 1.7 |
| | 65.5 | 9.5 | 3.6 | 65.5 | 8.1 | 1.6 |

*NM = Not Measured

TABLE B

Ulexite Solubility Data

| Solubilizing Liquid | Solubility @22.2° C. | | Solubility @65.5° C. | | Solubility @93.3° C. | |
|---|---|---|---|---|---|---|
| | kg/m$^3$ | lbm/bbl | kg/m$^3$ | lbm/bbl | kg/m$^3$ | lbm/bbl |
| Fresh Water | 4.7 | 1.65 | 7.6 | 2.66 | 7.3 | 2.56 |
| 1.09 g/cm$^3$ | 3.2 | 1.12 | 5.8 | 2.03 | 5.8 | 2.03 |
| 3% (w/w) KCl | 5.5 | 1.93 | 8.3 | 2.91 | 7.9 | 2.77 |

TABLE 1

| | Example | | | |
|---|---|---|---|---|
| | 1 | 2 | 3 | 4 |
| COMPOSITION | | | | |
| Base Brine Density, g/cm$^3$ | 1.00 | 1.08 | 1.14 | 1.20 |
| Volume Base Brine, m$^3$ | 1.0 | 1.0 | 1.0 | 1.0 |
| Potassium Chloride, kg | 30 | 0 | 0 | 0 |
| Hydroxyethlycellulose, kg | 2.857 | 2.857 | 2.857 | 2.857 |
| Xanthan Gum, kg | 1.143 | 1.143 | 1.143 | 1.143 |
| Carboxymethylcellulose, kg | 1.0 | 1.0 | 1.0 | 1.0 |
| Calcium Lignosulfonate, kg | 5.714 | 5.714 | 5.714 | 5.714 |
| Pregelatinized Corn Starch, kg | 11.428 | 11.428 | 11.428 | 11.428 |
| Ulexite, kg | 20.71 | 20.71 | 20.71 | 20.71 |
| PROPERTIES | | | | |
| Treating Fluid Weight, g/cm$^3$ | 1.036 | 1.10 | 1.158 | 1.217 |
| Plastic Viscosity, g/cm-sec | 0.18 | 0.19 | 0.23 | 0.25 |
| Yield Point, kg/m$^2$ | 1.464 | 1.464 | 1.659 | 1.562 |
| 10 sec. gel strength, kg/m$^2$ | 0.244 | 0.195 | 0.244 | 0.244 |
| 10 min. gel strength, kg/m$^2$ | 0.244 | 0.244 | 0.244 | 0.293 |
| API Filtrate, cm$^3$ | 6.7 | 6.0 | 5.6 | 3.2 |
| Sand Bed (80-120 mesh) | Seal | Seal | Seal | Seal |
| pH | 8.95 | 8.33 | 8.10 | 7.91 |

TABLE 2

CAKE SOLUBILITY FROM COMPLETION FLUIDS PREPARED WITH ULEXITE OR CALCIUM CARBONATE

| | Example 6 | Comparative Example A |
|---|---|---|
| Fluid Composition | | |
| 1.09 g/cm$^3$ NaCl Brine, m$^3$ | 1.0 | 1.0 |
| Hydroxyethyl Cellulose, kg | 2.857 | 2.857 |
| XC Polymer, kg | 1.0 | 1.0 |
| Carboxymethyl Cellulose, kg | 1.0 | 1.0 |
| Pregelatinized Starch, kg | 11.43 | 11.43 |
| Lime, kg | 0 | 1.429 |
| Ulexite (<74 microns), kg | 28.57 | 0 |
| Calcium Carbonate (<74 microns), kg | 0 | 28.57 |
| Test Conditions | | |

TABLE 2-continued
CAKE SOLUBILITY FROM COMPLETION FLUIDS PREPARED WITH ULEXITE OR CALCIUM CARBONATE

|  | Example 6 | Comparative Example A |
|---|---|---|
| Filter Media | Aloxite | Aloxite |
| Initial Permeability, md | 1000 | 769.5 |
| Filtrate Volume, cm$^3$ | 18 | 23 |
| Cake Thickness, cm | 0.08 | 0.12 |
| Wash Time, minutes | 60 | 120 |
| Test Results |  |  |
| Surface Cake Removal, % | 100 | 75 |
| Internal Cake Removal, %* | 100 | 5.5 |

*(Initial Permeability Final Permeability) × 100

I claim:

1. In a well treating fluid comprising:
   a. an aqueous suspension medium comprising an electrolyte solution having a density in the range from about 1.0 g/cm$^3$ to about 1.2 g/cm$^3$;
   b. a bridging agent; and
   c. a viscosifier and suspension additive in the amount of about 0.5 kg/m$^3$ to about 14 kg/m$^3$; the improvement which comprises utilizing as said bridging agent at least one hydrated borate selected from the group consisting of calcium borates, sodium calcium borates, and mixtures thereof, wherein said bridging agent has a particle size distribution wherein the range from about 1 micron to about 2000 microns, said treating fluid being free of polymers which contain two hydroxyl groups positioned in the cis-form on adjacent carbon atoms, or on carbon atoms in a 1,3 relationship which complex and cross-link in the presence of the borate anion of said hydrated borate at an alkaline pH.

2. The treating fluid of claim 1 wherein said bridging agent is selected from the group consisting of ulexite, colemanite, probertite, and mixtures thereof.

3. The fluid of claim 1 wherein the bridging agent has a particle size distribution within the range from about 1 micron to about 800 microns with at least 1% of the particles being greater than 44 microns.

4. The treating fluid of claim 3 wherein said bridging agent is selected from the group consisting of ulexite, colemanite, probertite, and mixtures thereof.

5. The fluid of claim 3 wherein at least 5% of the particles are greater than 44 microns, at least 50% of the particles are greater than 20 microns, and wherein less than 10% of the particles are less than 10 microns.

6. The treating fluid of claim 5 wherein said bridging agent is selected from the group consisting of ulexite, colemanite, probertite, and mixtures thereof.

7. The fluid of claim 1 including a fluid loss additive.

8. The fluid of claim 1 wherein the viscosifier and suspension additive is selected from the group consisting of water soluble cellulose ethers, xanthan gum, and mixtures thereof.

9. The fluid of claim 8 including a fluid loss additive.

10. The fluid of claim 9 wherein said fluid loss additive comprises calcium lignosulfonate in an amount from about 0.5 kg/m$^3$ to about 28 kg/m$^3$.

11. The fluid of claim 9 wherein said fluid loss control additive is selected from the group consisting of calcium lignosulfonate, chrome lignosulfonate, ferro chrome lignosulfonate, starch, starch derivatives, carboxymethyl cellulose having a degree of substitution in the range of 0.4 through 0.9, and mixtures thereof, wherein the amount of said fluid loss additive is from about 0.5 kg/m$^3$ to about 28 kg/m$^3$ of said fluid.

12. In a well completion and workover method wherein a subterranean formation in a well is contacted with an aqueous treating fluid to form a bridge and seal on said formation, said treating fluid containing an aqueous suspension medium having a density in the range from about 1.0 g/cm$^3$ to about 1.20 g/cm$^3$, said density being obtained by dissolving one or more soluble salts in said aqueous suspension medium, and a bridging agent having a particle size distribution within the range from about 1 micron to about 2000 microns and a viscosifier and suspension additive, the improvement which comprises utilizing as said bridging agent a hydrated borate selected from the group consisting of calcium borate, sodium calcium borate, and mixtures thereof, said treating fluid being free of polymers which contain two hydroxyl groups positioned in the cis-form on adjacent carbon atoms, or on carbon atoms in a 1,3 relationship which complex and cross-link in the presence of the borate anion of said hydrated borate at an alkaline pH.

13. The method of claim 12 wherein said bridging agent is selected from the group consisting of ulexite, colemanite, probertite, and mixtures thereof.

14. The method of claim 12 which additionally comprises dissolving said bridge and seal off of said formation with an aqueous liquid.

15. The method of claim 12 wherein the concentration of said viscosifier and suspension additive is from about 0.5 kg/m$^3$ to about 14 kg/m$^3$, and wherein said treating fluid also contains a fluid loss additive.

16. The method of claim 15 which additionally comprises dissolving said bridge and seal off of said formation with an aqueous liquid.

17. In a well treating method wherein a subterranean formation in a well is contacted with a treating fluid comprising:
(a) pumping said treating fluid in the well and contacting the formation with said treating fluid, wherein said treating fluid comprises:
   (1) an aqueous suspension medium having a density in the range from about 1.0 g/cm$^3$ to about 1.20 g/cm$^3$, said density being obtained by dissolving one or more soluble salts in said aqueous suspension medium;
   (2) a bridging agent; and
   (3) a minor amount of a fluid loss additive to inhibit the loss of fluid into the formation and a suspension additive to prevent settling of said bridging agent particles;
(b) controlling the pressure in the well by maintaining the density of said treating fluid in the range from about 1.007 g/cm$^3$ to about 1.26 g/cm$^3$;
(c) forming a bridge and seal on the formation by providing size distribution within the range from about 1 micron to about 2000 microns; and
(d) dissolving said bridge and seal from the formation for flow of hydrocarbons therefrom into the well;
the improvement which comprises utilizing as said bridging agent at least one hydrated borate selected from the group consisting of calcium borates, sodium calcium borates, and mixtures thereof, said treating fluid being free of polymers which contain two hydroxyl groups positioned in the cis-form on adjacent carbon atoms, or on carbon atoms in a 1,3 relationship which complex and cross-link in the presence of the borate anion of said hydrated borate at an alkaline pH.

18. The method of claim 17 wherein said bridging agent is selected from the group consisting of ulexite, colemanite, probertite, and mixtures thereof.

19. The well treating method of claim 17 wherein the fluid loss additive is in the amount of about 0.5 kg/m³ to about 28 kg/m³ of said treating fluid, and wherein said suspension additive is in the amount of about 0.5 kg/m³ to about 14 kg/m³ of said treating fluid.

20. The well treating method of claim 19 wherein said fluid loss additive is selected from the group consisting of calcium lignosulfonate, chrome lignosulfonate, ferro chrome lignosulfonate, starch, starch derivatives, carboxymethyl cellulose having a degree of substitution in the range of 0.4 through 0.9, and mixtures thereof.

* * * * *